Sept. 7, 1937.　　　　　F. P. LAWLER　　　　　2,092,128
COMBINATION TORQUE DISTRIBUTOR AND DIFFERENTIAL
Filed Feb. 16, 1935　　　　　2 Sheets-Sheet 2

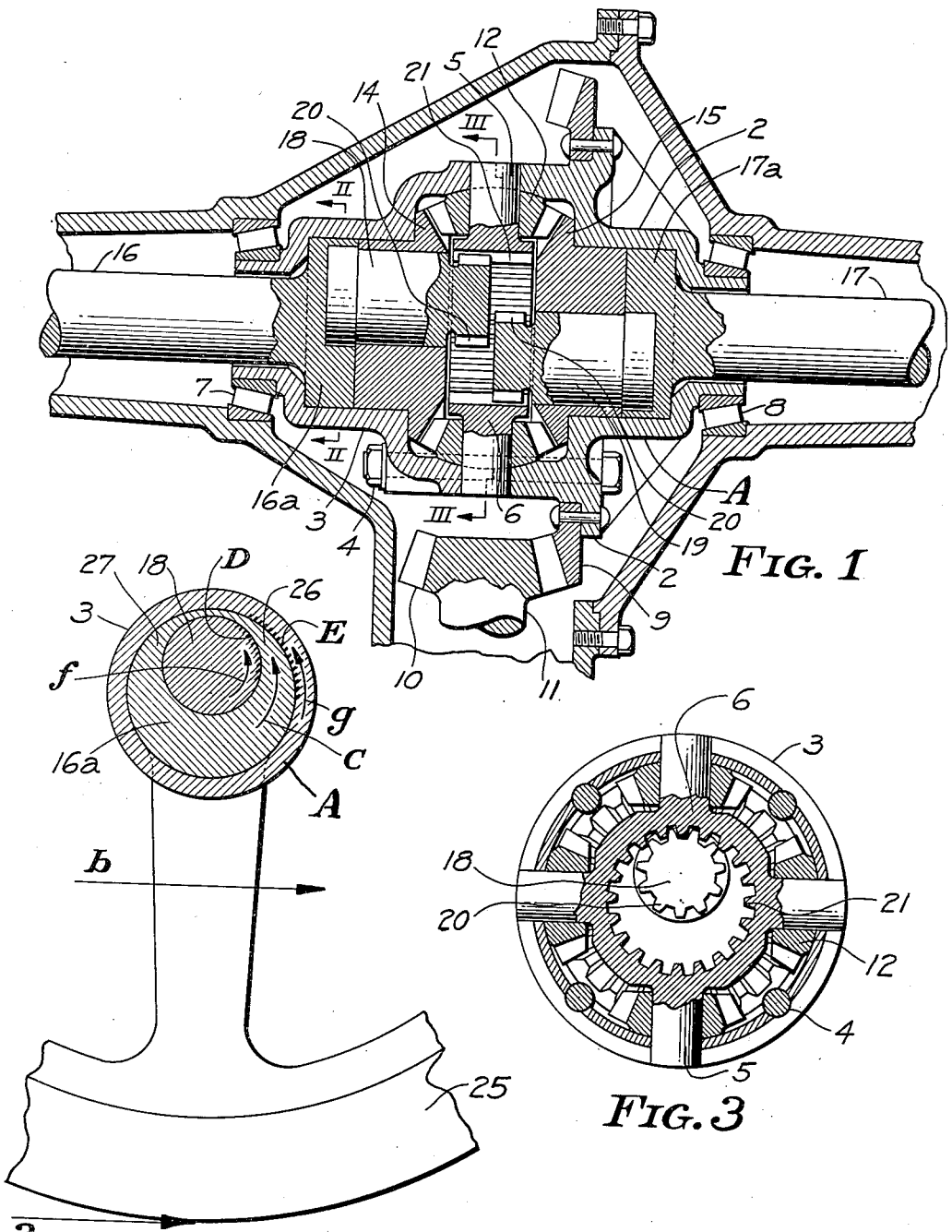

INVENTOR.
FRANK P. LAWLER
BY Townsend & Loftus
ATTORNEYS.

Patented Sept. 7, 1937

2,092,128

UNITED STATES PATENT OFFICE 2,092,128

COMBINATION TORQUE DISTRIBUTOR AND DIFFERENTIAL

Frank P. Lawler, San Francisco, Calif., assignor to The Torque-Distributor Co., a corporation of Nevada Application February 16, 1935, Serial No. 6,847

4 Claims. (Cl. 74—315)

This invention relates to a combination torque distributor and differential of the type disclosed in my former Patent Number 1,920,994, entitled Torque distributor, issued August 8, 1933, and particularly to the application of the torque distributor to a conventional type of differential.

The conventional differential used in conjunction with the driving axles of automotive vehicles is a highly efficient device as long as the two driving wheels have equal traction, but it immediately becomes inefficient when a difference in traction is encountered.

The differential would be a perfect mechanism if it were not for the fact that it can not under any circumstances deliver more torque to one driving wheel than it does to the other. This faulty characteristic would not be objectionable if the tractability of the two driving wheels always remained equal, but it is well known that in driving, conditions are often met where there is a great difference in the tractiveness of the two wheels as when one encounters a slippery surface or mudhole and the other remains on a highly tractive surface. This one defect in the conventional differential results first in a general loss in the tractability of the driving wheels, that is, the moment a difference in tractive surface is encountered by the two wheels the wheel with the greatest traction can only deliver as much torque as the wheel with the least traction and any added traction which it has available is lost; and, secondly, where a difference in tractive surface is encountered, particularly on slippery or wet ground, the wheel encountering the least resistance will tend to spin and often stall or mire the vehicle.

The object of the present invention is to retain the good or efficient features of the conventional differential and in addition thereto, to provide means whereby spinning of one wheel with relation to the other is prevented and whereby torque is automatically transmitted to the wheels substantially in proportion to their tractive ability.

The combined torque distributor and differential is shown by way of illustration in the accompanying drawings, in which—

Fig. 1 is a central, horizontal, longitudinal section through the combined torque distributor and differential.

Fig. 2 is a cross section taken on line II—II of Fig. 1, said view also diagrammatically indicating the wheel driven by the adjacent axle.

Fig. 3 is a cross section taken on line III—III of Fig. 1.

Figure 5:
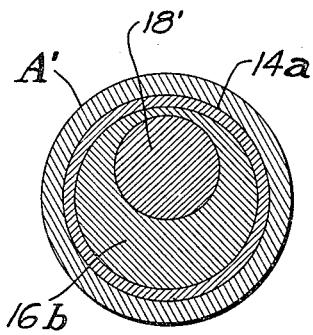
Fig. 5 is a cross section taken on line V—V of Fig. 4.

Referring to the drawings in detail, and particularly Fig. 1, A indicates a differential case divided into two sections 2 and 3. The sections are secured together by bolts 4 to permit the pins 5 of the spider 6 to be clamped between them. The case is supported in bearings 7 and 8 disposed at opposite ends of the axle housing and is driven by gear 9 and pinion 10 secured on the propeller shaft 11.

The pins 5 of the spider carry the usual pinions 12 and these mesh with compensating side gears 14 and 15 journaled at opposite ends of the case. The axles indicated at 16 and 17 extend into opposite ends of the case and their inner ends are enlarged, as indicated at 16a and 17a, and are journaled in the case for purposes hereinafter to be described.

The axles in place of being splined to the compensating gears are in this instance connected to them by pins 18 and 19, which will hereinafter be referred to as torque distributing pins. In the present instance only one pin is employed in conjunction with each side compensating gear and adjacent axle, but two or more may be employed. The torque distributing pins are each provided with a spur gear pinion 20 on the inner end and these pinions mesh with an internal gear 21 formed within the spider ring 6. The torque distributing pins are carried by and are journaled in the compensating side gears 14 and 15 and they are also rotatable with relation to the enlarged inner ends of the axles into which they extend.

Figure 8:
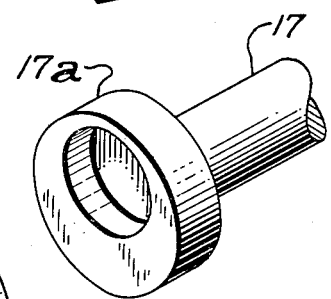
Fig. 8 is a perspective view of one of the axle inner ends.
Figure 7:
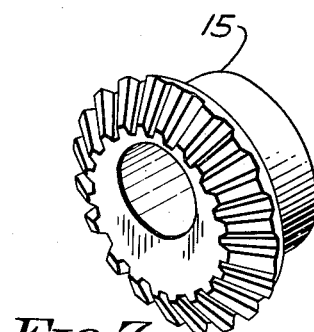
Fig. 7 is a perspective view of one of the side compensating gears shown in Fig. 1.
Figure 6:
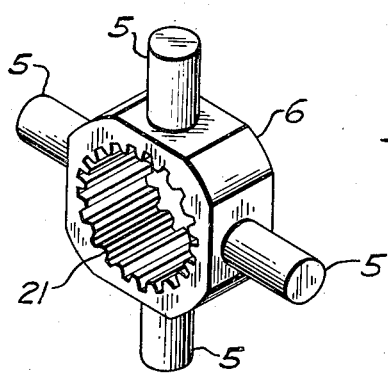
Fig. 6 is a perspective view of the spider.
Figure 9:
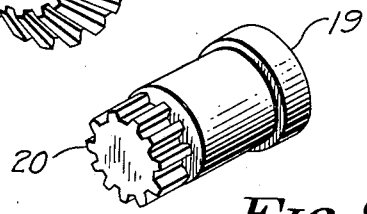
Fig. 9 is a perspective view of one of the torque distributing pins.

By referring to Figs. 7 and 8, it will be clearly seen that an opening is formed in the compensating gear for the reception of the torque distributing pin and that a similar opening is formed in the enlarged inner end of the axle for the reception of the outer end of the torque distributing pin.

The differential mechanism illustrated is of conventional construction throughout with the exception of the formation of the internal gear 21 within the spider ring which actuates the spur gear pinions 20, or in other words the torque distributing pins which connect the compensating gears and the axles driven thereby. By this slight change and addition to the conventional differential it becomes possible to retain all of the good features of the conventional differential, and in addition thereto, it becomes possible to prevent spinning of either driving wheel with relation to the other and, further, to transmit the power delivered by the differential to the respective axles and wheels in substantial proportion to the tractability of the same.

Before describing the operation of the mechanism as a whole, particular attention will be directed to Figs. 1 and 2. To begin with, if a vehicle is traveling in a direct or straight line and if both wheels travel over a surface affording equal traction the mechanism will function as a conventional differential. That is, the power delivered to the case through the gears 9 and 10 will be transmitted through the spider pinions to the compensating side gears 14 and 15 and from them through the torque distributing pins 18 and 19 to the respective axles in the form of torque, and the torque will be equally divided between the two axles and wheels. On the other hand if the surface over which the wheels travel changes, for instance if one wheel encounters a wet or slippery surface the driving force exerted in the conventional differential tends to spin the wheel affording the least traction. This, as previously pointed out, is the one defect of the conventional differential. This defect may be referred to as an advantage of the present structure as it is the tendency of the driving force to spin the wheel having the least traction which is harnessed and utilized to prevent spinning. The manner in which this is accomplished is best illustrated in Fig. 2, in which A indicates the case or driving member, 16a the enlarged inner end of the axle, 18 the torque distributing pin, and 25 the driven wheel or tire.

By again referring to Fig. 2 it will be noted that the pin 18 assumes an eccentric position with relation to the enlarged inner end 16a of the axle and that this eccentricity of the pin forms a pair of connected arcuate wedges, such as indicated at 26 and 27.

During normal driving or under any driving condition the wheel 25 encounters a certain amount of resistance which varies with the degree of the tractability of the ground over which the wheel travels. This resistance is indicated by the arrow a, if the vehicle is traveling in the direction of arrow b, the direction of the arrow a being reversed when the vehicle is reversed. This resistance, as already stated, exists under any driving condition and it is also present even though the wheel leaves the ground and in that instance is due solely to the inertia of the parts. This resistance is important as it is the force whereby one or another of the wedges 26 and 27 are actuated. The wheel 25 is directly connected to the axle of which 16a is a part, hence the resistance is also present in the axle and the direction of resistance is indicated by the arrow c when the vehicle is being driven in the direction of arrow b. It must now be pointed out that the axle and the wheel secured thereto is driven solely by the pin 18 and as this is the case the surfaces indicated at D and E will always be loaded and maintained in intimate contact with relation to each other, this loaded condition being due to the resistance indicated by the arrow c. It has previously been stated that the driving force which tends to spin the wheel affording the least resistance when a conventional differential is employed, is the force which, in the present invention, is utilized to prevent spinning. The manner in which this force is utilized will now be described.

If surfaces of unequal traction are encountered by the respective wheels the driving force transmitted to the case will obviously tend to spin the wheel encountering the least resistance. Before spinning can actually take place, and assuming it is the left hand wheel and axle which affords the least resistance, the compensating gear 14 will have to speed up with relation to the case A, and if it does speed up it will tend to rotate the torque distributing pin 18 in the direction of arrow f, see Fig. 2. This can be clearly seen by referring to Fig. 3; that is, if the compensating gear runs ahead of the case A it will also run ahead of the spider ring 6, which is secured to the case and as the torque distributing pin and the spur gear pinion 20 are carried by the gear 14, rotation will be transmitted to the pin in a direction of arrow f, Fig. 2. This tendency of the compensating gear to drive the axle at a greater speed than the case causes the case to rotate relative to the axle in the direction of arrow g, see Fig. 2, thereby causing an instantaneous clutching action between the wedge 26 and the surfaces D and E, as the wedge is driven between these surfaces by the tendency of the resistance C to always force or drive the wedge in the direction of arrow c. This automatic clutching action or coupling action locks the three members with relation to each other, or tends to do so, and when they lock the entire differential mechanism is secured against differential action, and when this occurs spinning of the axle and wheel is prevented and the torque and power which would normally be dissipated in spinning the wheel encountering the least resistance will in this instance be transmitted to the other axle. Hence, it can be seen that by this means and by the addition of the two simple torque distributing pins to the conventional differential, it is possible to (at desired times) transmit more torque to one wheel than to the other, thereby correcting the fundamental fault of the differential gear, namely, its being limited to equal torque distribution to both wheels at all times.

The degree of lock or clutching action obtained in a structure of this character depends largely upon the angularity of the surfaces presented by the arcuate wedges 26 and 27, and as these angular surfaces can be varied by changing the size and the eccentricity of the pin 18, any degree of lock or clutching action can be obtained from zero to one hundred per cent. Because of this extremely desirable flexibility of design, it is possible to effectively combine, in a single construction, all of the good features of the conventional differential gear with all of the good features of a solid axle, and to make the percentage of inter-axle lock or influence any desired value. Also, by implying the two wedges 26 and 27, the wedge 26 will function when driving ahead and the wedge 27 when reversing.

There are only two conditions under which the speed of rotation between the axles and the case tends to change. The first condition, to-wit, that which takes place when the driving force tends to spin the axle affording the least resistance, as described above; and the second condition is that created when the wheels are caused to travel at different speeds incident to rounding a corner. Under the first condition only one force is present in the axle, to-wit, the driving force delivered to the case through the propeller shaft and the gears 9 and 10. Under the second condition two forces are present, namely, the driving force and a secondary force generated by the wheels themselves, plus a small amount of power and force which is put into the steering wheel and which is amplified by the lever arm through which the steering wheels act. In rounding a curve the outer wheel travels at a greater speed than the inner wheel, and it is under this condition that the secondary force is generated and tends to neutralize or relieve the resistance indicated by the arrow c, see Fig. 2, and as it neutralizes or relieves this force on the wedge the clutching action between the members 16a and 18 is prevented; hence permitting free compensating action and rotation of the wheels relative to one another when the mechanism is acted upon by the secondary force.

Plainly speaking, the structure might be said to embody a differential mechanism, together with a pair of axles driven thereby, and a pair of double acting clutches disposed one between each axle and the differential mechanism. These clutches are automatically actuated and when influenced by the secondary force are free, but whenever there is a tendency of the primary driving force to spin one axle with relation to the other the clutch on that side locks the differential mechanism and thereby prevents spinning of that axle and furthermore transmits a correspondingly greater portion of the available torque to the other axle.

Figure 4:
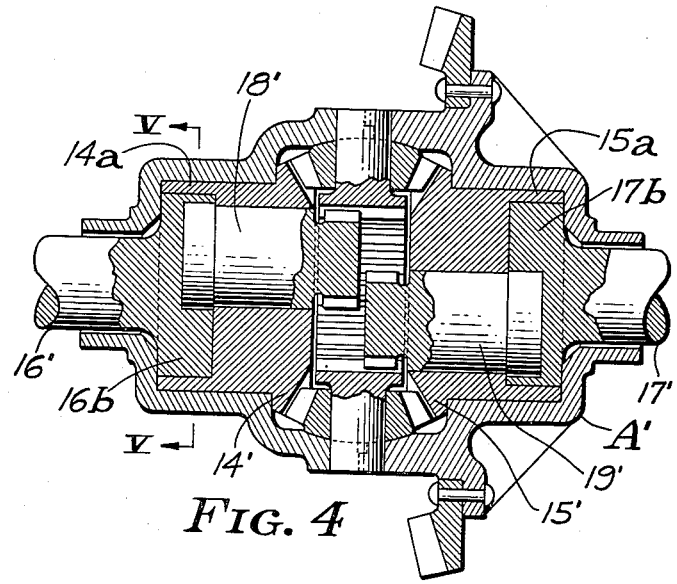
Fig. 4 is a longitudinal section showing a slightly modified form of the combined torque distributor and differential.

The modified construction, indicated in Figs. 4 and 5, shows a method whereby the case A' can be relieved of all load incident to the clutching action. The compensating side gears 14' and 15' are shown as having cylindrical extensions 14a and 15a surrounding the inner enlarged ends 16b and 17b of the axles 16' and 17' and thus forming a journal therefor. By means of this construction all of the clutching action takes place between the cylindrical extensions 14a and 15a and their corresponding torque distributing drive pins 18' and 19'. In this instance the compensating side gears simply float in the bearings in which they are journaled in the case A' just as they do in the conventional differential, since their load is simply torque emanating from theoretically balanced couples. This construction has the advantage that it allows all of the parts which function in the clutching action to be made of extremely hard steel while the case can be made of much softer and cheaper material. In operation no appreciable rotational movement takes place between the enlarged axle ends 16b and 17b and the cylindrical extensions 14a and 15a, such movement as does take place being limited by clearance between the parts. For a given degree of eccentricity and corresponding proportion of the parts the clutching action in the construction shown in Figs. 4 and 5 will be considerably modified over that shown in Fig. 1, but this is not objectionable since varying classes of work require a varying degree of inter-axle influence or lock, and as has been pointed out before, it is a distinct advantage to be able to vary the degree of control which one axle has over the other over a wide range so that the unit can be designed for the most efficient point to suit diversified conditions of operation.

Having thus described my invention, what I claim and desire to secure by Letters Patent is:—

1. In a differential mechanism a power driven case, a rotary set of differential gears journaled in the case, said gears including a pair of side compensating gears, a pair of axles, one for each side compensating gear, a pin carried by each side compensating gear and projecting into the adjacent axles and forming a driving connection between said gears and axles, said pins being eccentric with relation to the axis of rotation of the said gears and axles, and means actuated by said pins for securing the differential gears against differential movement when the power transmitted to the differential gears tends to spin one of the axles with relation to the other.

2. In a differential mechanism a power driven case, a rotary set of differential gears journaled in the case, said gears including a pair of side compensating gears, a pair of axles, one for each side compensating gear, a pin carried by each side compensating gear and projecting into the adjacent axles and forming a driving connection between said gears and axles, said pins being eccentric with relation to the axis of rotation of the said gears and axles, said pins being rotatable with relation to said gears and axles, means for rotating the pins when the power transmitted to the differential gears tends to spin one axle with relation to the other, and means actuated by rotation of the pins for securing the differential gears against differential movement.

3. In a differential mechanism a power driven case, a spider secured in the case, a pair of side compensating gears supported in the case, pinions journaled on the spider and intermeshing with the side compensating gears, a pair of axles one for each side compensating gear, a pin carried by each side compensating gear and projecting into the adjacent axle and forming a driving connection between the side compensating gear and the axle, said pins being eccentric with relation to the axis of rotation of the side compensating gears and the axles, said pins being rotatable with said gears and axles, a pinion gear secured on each pin, an internal gear secured to the spider and intermeshing with the pinion gears, said internal gear adapted to impart a rotary movement to the pins when the power transmitted to the differential gears tends to spin one axle with relation to the other, and means actuated by rotation of said pins for securing the differential gears against differential movement.

4. In a differential mechanism a power driven case, a spider secured in the case, a pair of side compensating gears supported in the case, pinions journaled on the spider and intermeshing with the side compensating gears, a pair of axles one for each side compensating gear, a pin carried by each side compensating gear and projecting into the adjacent axle and forming a driving connection between the side compensating gear and the axle, said pins being eccentric with relation to the axis of rotation of the side compensating gears and the axles, said pin being rotatable with said gears and axles, a pinion gear secured on each pin, an internal gear secured to the spider and intermeshing with the pinion gears, said internal gear adapted to impart a rotary movement to the pins when the power transmitted to the differential gears tends to spin one axle with relation to the other, and a pair of clutching members actuated by rotation of said pins, said clutching members securing the differential gears against differential movement.

FRANK P. LAWLER.